United States Patent
Doi et al.

(10) Patent No.: US 11,580,989 B2
(45) Date of Patent: Feb. 14, 2023

(54) TRAINING METHOD OF A SPEAKER IDENTIFICATION MODEL BASED ON A FIRST LANGUAGE AND A SECOND LANGUAGE

(71) Applicant: Panasonic Intellectual Property Corporation of America, Torrance, CA (US)

(72) Inventors: Misaki Doi, Osaka (JP); Takahiro Kamai, Kyoto (JP); Kousuke Itakura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 159 days.

(21) Appl. No.: 16/996,408

(22) Filed: Aug. 18, 2020

(65) Prior Publication Data

US 2021/0056955 A1 Feb. 25, 2021

Related U.S. Application Data

(60) Provisional application No. 62/890,872, filed on Aug. 23, 2019.

(30) Foreign Application Priority Data

Apr. 24, 2020 (JP) .............................. JP2020-077113

(51) Int. Cl.
*G10L 17/04* (2013.01)
*G10L 17/02* (2013.01)
(Continued)

(52) U.S. Cl.
CPC .............. *G10L 17/04* (2013.01); *G10L 17/02* (2013.01); *G10L 17/18* (2013.01); *G10L 21/003* (2013.01); *G10L 15/063* (2013.01); *G10L 15/16* (2013.01)

(58) Field of Classification Search
CPC ..................................................... G10L 17/04
See application file for complete search history.

(56) References Cited

U.S. PATENT DOCUMENTS

| | | | |
|---|---|---|---|
| 6,751,590 B1 * | 6/2004 | Chaudhari | G10L 17/02 704/250 |
| 2012/0253781 A1 * | 10/2012 | Qian | G10L 21/003 704/2 |

(Continued)

OTHER PUBLICATIONS

Keskin, Gokee, et al. "Many-to-many voice conversion with out-of-dataset speaker support." arXiv preprint arXiv: 1905.02525 (2019). (Year: 2019).*

(Continued)

*Primary Examiner* — Douglas Godbold
(74) *Attorney, Agent, or Firm* — Wenderoth, Lind & Ponack, L.L.P.

(57) ABSTRACT

A training method of training a speaker identification model which receives voice data as an input and outputs speaker identification information for identifying a speaker of an utterance included in the voice data is provided. The training method includes: performing voice quality conversion of first voice data of a first speaker to generate second voice data of a second speaker; and performing training of the speaker identification model using, as training data, the first voice data and the second voice data.

6 Claims, 6 Drawing Sheets

(51) Int. Cl.
  *G10L 17/18* (2013.01)
  *G10L 21/003* (2013.01)
  *G10L 15/16* (2006.01)
  *G10L 15/06* (2013.01)

(56) References Cited

U.S. PATENT DOCUMENTS

| | | | | |
|---|---|---|---|---|
| 2015/0187356 | A1* | 7/2015 | Aronowitz | G10L 17/24 |
| | | | | 704/249 |
| 2017/0249953 | A1* | 8/2017 | Yassa | G10L 13/06 |
| 2018/0350348 | A1* | 12/2018 | Fukuda | G10L 21/003 |
| 2021/0019641 | A1* | 1/2021 | Park | G10L 17/04 |
| 2021/0050025 | A1* | 2/2021 | Huffman | G10L 25/30 |
| 2021/0166715 | A1* | 6/2021 | Bharitkar | G10L 17/04 |
| 2021/0233541 | A1* | 7/2021 | Chen | G10L 17/18 |
| 2021/0241776 | A1* | 8/2021 | Sivaraman | G10L 21/038 |
| 2022/0005481 | A1* | 1/2022 | Kim | G10L 17/02 |

OTHER PUBLICATIONS

Kinnunen, Tomi, et al. "The Voice Conversion Challenge 2018: database and results." (2018). (Year: 2018).*

Shahnawazuddin, S., et al. "In-domain and out-of-domain data augmentation to improve children's speaker verification system in limited data scenario." ICASSP 2020-2020 IEEE International Conference on Acoustics, Speech and Signal Processing (ICASSP). IEEE, 2020. (Year: 2020).*

David Snyder et al., "X-Vectors: Robust DNN Embeddings for Speaker Recognition", 2018 IEEE International Conference on Acoustics, Speech, and Signal Processing (ICASSP), pp. 5329-5333.

Patrick Lumban Tobing et al., "Non-Parallel Voice Conversion with Cyclic Variational Autoencoder", arXiv:1907.10185v1 [eess.AS], Jul. 24, 2019.

* cited by examiner

| Voice data | Speaker identification information |
|---|---|
| Voice file A | 0001 |
| Voice file B | 0001 |
| ⋮ | ⋮ |
| Voice file K | 0002 |
| Voice file L | 0002 |
| ⋮ | ⋮ |
| Voice file X | 0003 |
| Voice file Y | 0003 |
| ⋮ | ⋮ |

TRAINING METHOD OF A SPEAKER IDENTIFICATION MODEL BASED ON A FIRST LANGUAGE AND A SECOND LANGUAGE

CROSS REFERENCE TO RELATED APPLICATIONS

The present application is based on and claims priority of U.S. Patent Application No. 62/890872 filed on Aug. 23, 2019 and priority of Japanese Patent Application No. 2020-077113 filed on Apr. 24, 2020. The entire disclosures of the above-identified applications, including the specifications, drawings and claims are incorporated herein by reference in their entirety.

FIELD

The present disclosure relates to a technique for identifying a speaker.

BACKGROUND

Techniques for identifying speakers using speaker identification models have been conventionally known (for example, see Non-patent Literature 1 ("X-VECTORS: ROBUST DNN EMBEDDINGS FOR SPEAKER RECOGNITION" ICASSP 2018:5329-5333, David Snyder, Daniel Garcia-Romero, Gregory Sell, Daniel Povey, and Sanjeev Khudanpur).

SUMMARY

Technical Problem

It is desired that speakers be identified with high accuracy.

Solution to Problem

A training method according to an aspect of the present disclosure is a training method of training a speaker identification model which receives voice data as an input and outputs speaker identification information for identifying a speaker of an utterance included in the voice data. The training method including: performing voice quality conversion of first voice data of a first speaker to generate second voice data of a second speaker; and performing training of the speaker identification model using, as training data, the first voice data and the second voice data.

A speaker identification method according to an aspect of the present disclosure is a method of identifying a speaker. The speaker identification method includes: inputting voice data to the speaker identification model which has been trained in advance using the training method described above; and outputting the speaker identification information from the speaker identification model.

A recording medium according to an aspect of the present disclosure is a non-transitory computer-readable recording medium having a program recorded thereon. The program causes a computer to execute training of a speaker identification model which receives voice data as an input and outputs speaker identification information for identifying a speaker of an utterance included in the voice data. The training includes: performing voice quality conversation of first voice data of a first speaker to generate second voice data of a second speaker; and performing training of the speaker identification model using, as training data, the first voice data and the second voice data.

It is to be noted that general and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiment will be apparent from the Specification and Drawings. The benefits and/or advantages may be individually obtained by the various embodiment and features of the Specification and Drawings, which need not all be provided in order to obtain one or more of such benefits and/or advantages.

Advantageous Effects

The training method, etc. according to the present disclosure makes it possible to identify a speaker with high accuracy.

BRIEF DESCRIPTION OF DRAWINGS

These and other advantages and features will become apparent from the following description thereof taken in conjunction with the accompanying Drawings, by way of a non-limiting example of an embodiment disclosed herein.

DESCRIPTION OF EMBODIMENT

Figure 1:
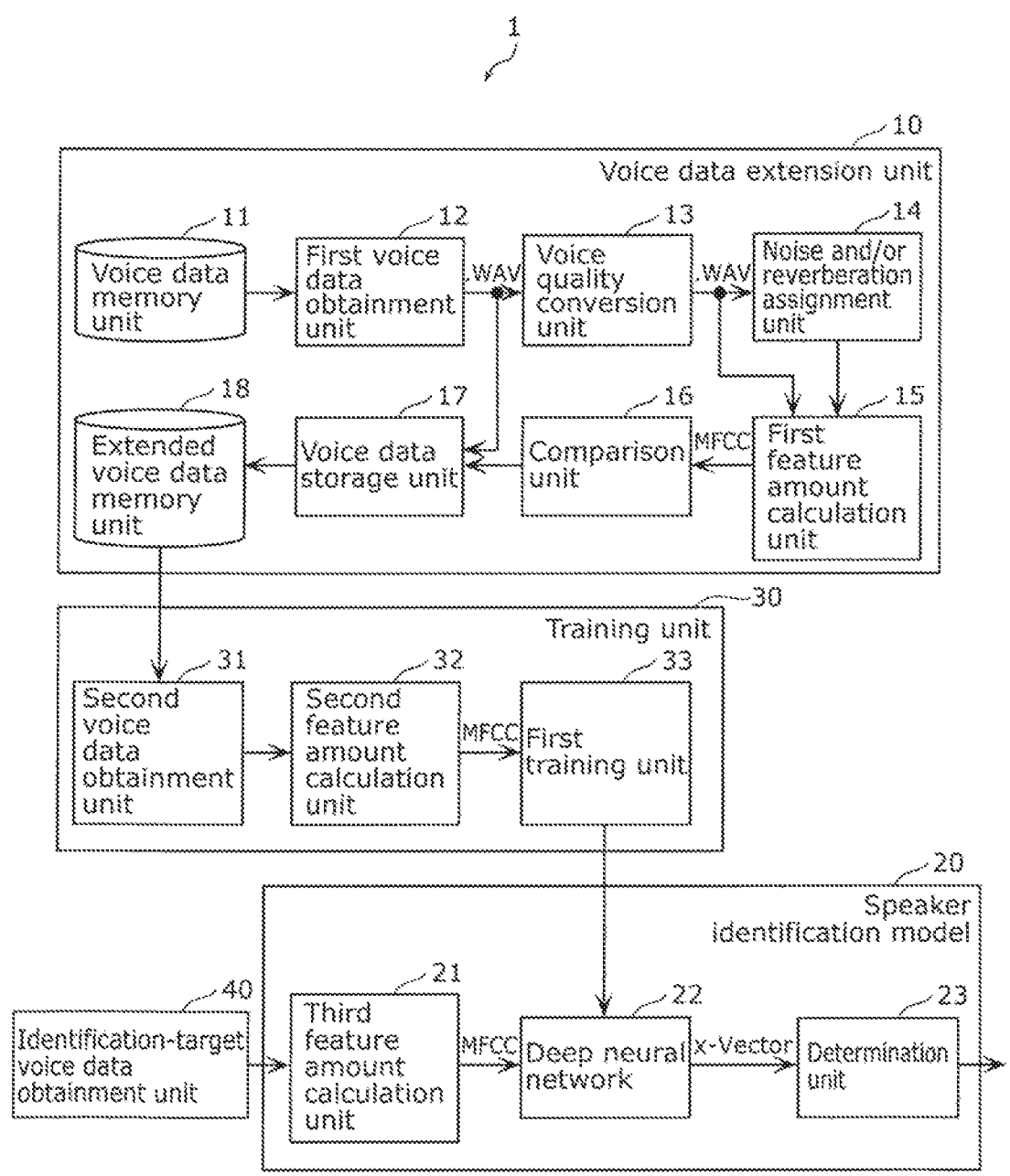
FIG. 1 is a block diagram illustrating an example of a configuration of a speaker identification apparatus according to an embodiment.

Underlying Knowledge Forming Basis of the Present Disclosure

Speaker identification techniques for identifying a speaker using a speaker identification model trained in advance using, as training data, voice data associated with identification information for identifying the speaker have been conventionally known.

Conventionally, noise and/or reverberation assignment, etc. is performed on original voice data for training in order to increase the number of training data (hereinafter, "to increase the number of training data" is also referred to as "extension of training data". However, in the extension of training data by the conventional noise and/or reverberation assignment, etc. does not make it possible to increase contents and languages (Japanese, English, etc.) of utterances of one speaker. For this reason, in some cases, influence of contents and/or languages in training of a speaker identification model cannot be reduced sufficiently.

In view of this, the inventors have studied and performed experiments keenly and repeatedly in order to identify a speaker with high accuracy in identification of the speaker using a speaker identification model. As a result, the inventors have arrived at the training method, etc. indicated below.

A training method according to an aspect of the present disclosure is a training method of training a speaker identification model which receives voice data as an input and outputs speaker identification information for identifying a speaker of an utterance included in the voice data. The training method includes: performing voice quality conversion of first voice data of a first speaker to generate second voice data of a second speaker; and performing training of the speaker identification model using, as training data, the first voice data and the second voice data.

The training method as described above makes it possible to increase the number of voice data of the second speaker in the extension of training data in the training of the speaker identification model without being restricted by the content and language of the utterance. For this reason, it is possible to increase the accuracy of speaker identification by the speaker identification model.

Accordingly, the training method makes it possible to identify a speaker with high accuracy.

In addition, the voice quality conversion may be processing based on voice data of the first speaker and voice data of the second speaker.

In addition, the voice quality conversion may include inputting the first voice data to a voice quality conversion model and outputting the second voice data from a voice quality conversion model. The voice quality conversion model has been trained in advance to output voice data of the second speaker upon receiving, as the input, voice data of the first speaker.

In addition, the voice quality conversion model may include a deep neural network which receives, as the input, voice data in waveform audio (WAV) format and outputs voice data in the WAV format.

In addition, the voice quality conversion may be processing based on voice data of the first speaker and voice data of a third speaker.

In addition, the speaker identification model may include a deep neural network which obtains, as the input, an utterance feature amount indicating a feature of an utterance included in voice data and outputs a speaker-dependent feature amount indicating a feature of a speaker.

A speaker identification method according to an aspect of the present disclosure is a method of identifying a speaker. The speaker identification method includes: inputting voice data to the speaker identification model which has been trained in advance using the training method described above; and outputting the speaker identification information from the speaker identification model.

The training method as described above makes it possible to increase the number of voice data of the second speaker in the extension of training data in the training of the speaker identification model without being restricted by the content and language of the utterance. For this reason, it is possible to increase the accuracy of speaker identification by the speaker identification model.

Accordingly, the speaker identification method makes it possible to identify a speaker with high accuracy.

A recording medium according to an aspect of the present disclosure is a non-transitory computer-readable recording medium having a program recorded thereon. The program causes a computer to execute training of a speaker identification model which receives voice data as an input and outputs speaker identification information for identifying a speaker of an utterance included in the voice data. The training includes: performing voice quality conversion of first voice data of a first speaker to generate second voice data of a second speaker; and performing training of the speaker identification model using, as training data, the first voice data and the second voice data.

The recording medium as described above makes it possible to increase the number of voice data of the second speaker in the extension of training data in the training of the speaker identification model without being restricted by the content and language of the utterance. For this reason, it is possible to increase the accuracy of speaker identification by the speaker identification model.

Accordingly, the recording medium makes it possible to identify a speaker with high accuracy.

It is to be noted that general and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiment according to the present disclosure is described in greater detail with reference to the accompanying Drawings. The exemplary embodiment described below shows a general or specific example. The numerical values, shapes, elements, steps, the processing order of the steps etc. shown in the following exemplary embodiment are mere examples, and therefore do not limit the scope of the appended Claims and their equivalents. Therefore, among the elements in the following exemplary embodiment, those not recited in any one of the independent claims are described as optional elements.

EMBODIMENT

Hereinafter, a speaker identification apparatus according to an embodiment is described. The speaker identification apparatus obtains voice data, and outputs identification information for identifying the speaker of an utterance included in the voice data.

<Configuration>

FIG. 1 is a block diagram illustrating an example of a configuration of speaker identification apparatus 1 according to this embodiment.

As illustrated in FIG. 1, speaker identification apparatus 1 includes: voice data extension unit 10; speaker identification model 20; training unit 30; and identification-target voice data obtainment unit 40.

Voice data extension unit 10 extends training data for training speaker identification model 20 (in other words, increases the number of training data). Voice data extension unit 10 may be implemented by, for example, a computer including a microprocessor, a memory, a communication interface, etc. In this case, various kinds of functions of voice data extension unit 10 are implemented by means of the microprocessor executing a program which is recorded in the memory. In addition, voice data extension unit 10 may be implemented by, for example, distributed computing or cloud computing by a plurality of computers which communicate with each other.

As illustrated in FIG. 1, voice data extension unit 10 includes: voice data memory unit 11; first voice data obtainment unit 12; voice quality conversion unit 13; noise and/or reverberation assignment unit 14; first feature amount calculation unit 15; comparison unit 16; voice data storage unit 17; and extended voice data memory unit 18.

Training unit 30 performs training of speaker identification model 20 using training data extended by voice data extension unit 10. Training unit 30 may be implemented by, for example, a computer including a microprocessor, a memory, a communication interface, etc. In this case, various kinds of functions of training unit 30 are implemented by means of the microprocessor executing a program which is recorded in the memory. In addition, training unit 30 may be implemented by, for example, distributed computing or cloud computing by a plurality of computers which communicate with each other.

As illustrated in FIG. 1, training unit 30 includes: second voice data obtainment unit 31; second feature amount calculation unit 32; and first training unit 33.

Speaker identification model 20 receives voice data as an input, and outputs identification information for identifying the speaker of an utterance included in the voice data. Speaker identification model 20 may be implemented by, for example, a computer which includes a microcomputer, a memory, a communication interface, etc. In this case, various kinds of functions of speaker identification model 20 are implemented by means of the microprocessor executing a program which is recorded in the memory. In addition, speaker identification model 20 may be implemented by, for example, distributed computing or cloud computing by a plurality of computers which communicate with each other.

As illustrated in FIG. 1, speaker identification model 20 includes: third feature amount calculation unit 21; deep neural network (DNN) 22; and determination unit 23.

Identification-target voice data obtainment unit 40 obtains voice data which is an identification target in speaker identification performed by speaker identification model 20. For example, identification-target voice data obtainment unit 40 may include a communication interface for communicating with an outside device, and obtain voice data from the outside device via the communication interface. In addition, for example, identification-target voice data obtainment unit 40 may include an input/output port (such as a USB port), and obtain voice data from an outside memory device (such as a USB memory) connected to the input/output port. In addition, for example, identification-target voice data obtainment unit 40 may include a microphone, and obtain voice data by converting the voice input to the microphone into an electric signal.

Hereinafter, each of elements included in voice data extension unit 10 is described.

Voice data memory unit 11 stores voice data and speaker identification information for identifying the speaker of an utterance included in the voice data and associated with the voice data, in association with each other.

Figures 2, 3:
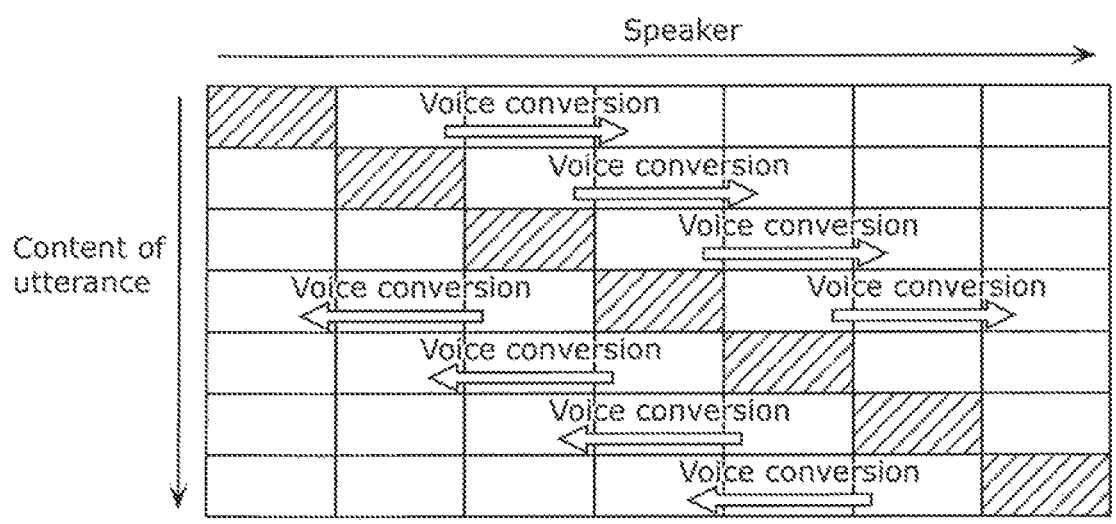
FIG. 2 is a schematic diagram illustrating one example of how a voice data memory unit according to the embodiment stores voice data and speaker identification information in association with each other.
FIG. 3 is a schematic diagram illustrating one example of how a voice quality conversion unit according to the embodiment converts voice data of one speaker into voice data of a plurality of other speakers, and outputs the resulting voice data.

FIG. 2 is a schematic diagram illustrating one example of how voice data memory unit 11 stores a plurality of voice data and a plurality of pieces of speaker identification information in one-to-one association with each other.

As illustrated in FIG. 2, voice data memory unit 11 stores the plurality of voice data respectively associated with the plurality of different pieces of speaker identification information. The voice data and speaker identification information stored in voice data memory unit 11 are used as training data for performing training of speaker identification model 20.

With reference to FIG. 1 again, a continuation of the description of speaker identification apparatus 1 is given.

For example, voice data memory unit 11 may include a communication interface which communicates with an outside device, and store voice data and speaker identification information associated with the voice data which have been obtained from the outside device through the communication interface. In addition, for example, voice data memory unit 11 may include an input/output port (such as a USB port), and store voice data and speaker identification information associated with the voice data which have been obtained from the outside device (such as a USB memory) connected to the input/output port.

Here, a description is given assuming that the voice data has a WAV format. However, the format of voice data does not always need to be limited to the WAV format, and, for example, other formats such as an AIFF format and an AAC format are also possible.

First voice data obtainment unit 12 obtains voice data and speaker identification information associated with the voice data from voice data memory unit 11.

Voice quality conversion unit 13 converts the voice data obtained by first voice data obtainment unit 12 into voice data uttered by a speaker (hereinafter also referred to as "another or the other speaker, or (the) other speakers" other than the speaker identified based on the speaker identification information associated with the voice data. More specifically, voice quality conversion unit 13 changes frequency components of the utterance included in the voice data to generate voice data uttered by other speakers, and outputs the resulting voice data.

Voice quality conversion unit 13 converts the voice data of one speaker to a plurality of voice data of the other speakers and outputs the plurality of voice data, so that voice quality conversion unit 13 is being capable of outputting the plurality of voice data of the utterances having the same content and made by mutually different speakers. Furthermore, when voice data of one speaker includes a Japanese utterance, voice quality conversion unit 13 is capable of converting the voice data into Japanese versions of utterances made by other speakers who do not always speak Japanese. In other words, voice quality conversion unit 13 is capable of converting the voice data of the one speaker into the voice data of the other speakers and outputs the resulting voice data without being restricted by the content and language of the utterance of the voice data before being converted.

FIG. 3 is a schematic diagram illustrating one example of how voice quality conversion unit 13 converts voice data of one speaker into voice data of a plurality of other speakers, and outputs the resulting voice data.

As illustrated in FIG. 3, voice quality conversion unit 13 is capable of increasing the number of voice data which are used as training data for performing training of speaker identification model 20 without being restricted by the contents and languages of the utterances.

With reference to FIG. 1 again, a continuation of the description of speaker identification apparatus 1 is given.

For example, voice quality conversion unit 13 may be implemented by a conventional voice quality converter which is widely available. In addition, for example, voice quality conversion unit 13 may be implemented by using a voice quality conversion model trained in advance to receive, as an input, voice data of a first speaker and output voice data of a second speaker. Here, a description is given assuming that voice quality conversion unit 13 is implemented by using a voice quality conversion model trained in advance to output voice data of a second speaker upon receiving voice data of a first speaker.

Figure 4:
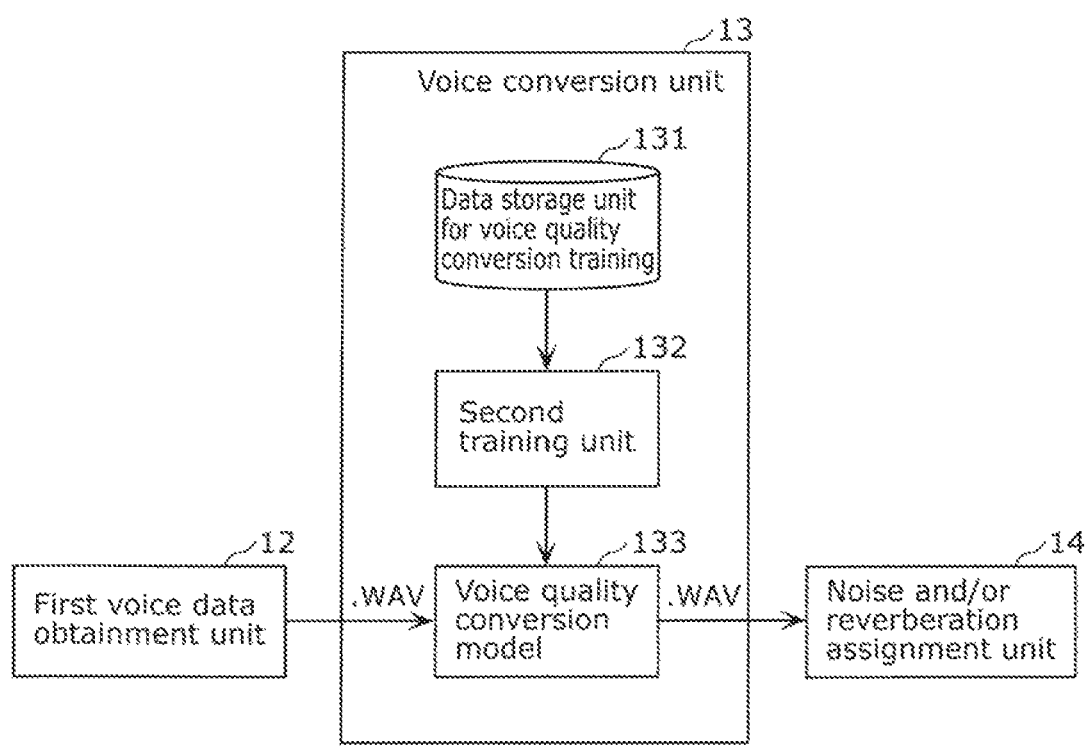
FIG. 4 is a block diagram illustrating an example of a configuration of a voice quality conversion unit according to the embodiment.

FIG. 4 is a block diagram illustrating an example of a configuration of voice quality conversion unit 13.

As illustrated in FIG. 4, voice quality conversion unit 13 includes: data memory storage unit for voice quality conversion training 131; second training unit 132; and voice quality conversion model 133.

Voice quality conversion model 133 is a Deep Neural Network (DNN) trained in advance so that voice quality conversion model 133 receives, for each of a plurality of speaker pairs, voice data of a first speaker who is one of the speakers in one of the speaker pairs and outputs voice data of a second speaker which is the other one of the speakers, and that voice quality conversion model 133 receives voice data of the second speaker and outputs voice data of the first speaker. Here, as one example, a description is given assuming that voice quality conversion model 133 is a cycleVAE trained in advance so that voice quality conversion model 133 receives, for each of a plurality of speaker pairs, voice data having a WAV format of a first speaker and outputs voice data having the WAV format of a second speaker, and that voice quality conversion model 133 receives voice data having the WAV format of the second speaker and outputs voice data having the WAV format of the first speaker. However, there is no need to limit the DNN to be of the cycleVAE as long as the DNN has been trained in advance so that voice quality conversion model 133 receives, for each of the plurality of speaker pairs, voice data of a first speaker in the speaker pair and outputs voice data of a second speaker in the speaker pair, and that voice quality conversion model 133 receives voice data of the second speaker and outputs voice data of the first speaker.

Data memory unit for voice quality conversion training 131 stores training data for performing training of voice quality conversion model 133. More specifically, data memory unit for voice quality conversion training 131 stores voice data (here, voice data having the WAV format) of each of the plurality of speakers who are targets of voice quality conversion model 133.

Second training unit 132 performs training of voice quality conversion model 133 by using training data which are stored in data memory unit for voice quality conversion training 131 so that voice quality conversion model 133 receives, for each of a plurality of speaker pairs, voice data of a first speaker who is one of the speaker pair and outputs voice data of a second speaker who is the other one of the speaker pair, and that voice quality conversion model 133 receives voice data of the second speaker and outputs voice data of the first speaker.

With reference to FIG. 1 again, a continuation of the description of speaker identification apparatus 1 is given.

Noise and/or reverberation assignment unit 14 assigns noise (for example, four kinds of noise) and reverberation (for example, one kind of reverberation) to each of voice data which are output from voice quality conversion unit 13, and outputs voice data with noise and voice data with reverberation. In this way, noise and/or reverberation assignment unit 14 is capable of further increasing the number of voice data.

First feature amount calculation unit 15 calculates an utterance feature amount indicating a feature of the utterance included in voice data, based on each of voice data which is output from voice quality conversion unit 13 and voice data which is output from noise and/or reverberation assignment unit 14. Here, as one example, a description is given assuming that first feature amount calculation unit 15 calculates Mel-Frequency Cepstrum Coefficients (MFCCs) indicating vocal tract characteristics of a speaker as an utterance feature amount. However, first feature amount calculation unit 15 does not always need to be for use in an example in which an MFCC is calculated as long as first feature amount calculation unit 15 can calculate an utterance feature amount indicating a feature of a speaker. For example, first feature amount calculation unit 15 may calculate, as an utterance feature amount, a result obtained by multiplying a voice signal of an utterance with a mel-filter bank. For example, first feature amount calculation unit 15 may calculate, as an utterance feature amount, a spectrogram of the voice signal of the utterance.

Comparison unit 16 compares, for each of speaker feature amounts (hereinafter, the speaker feature amount is also referred to as a "first speaker feature amount") output from first feature amount calculation unit 15, the first speaker feature amount and a speaker feature amount (hereinafter, also referred to as a "second speaker feature amount") of the speaker of an utterance included in voice data which is the calculation source of the first speaker feature amount.

When the comparison result indicates that (1) the similarity between the first speaker feature amount and the second speaker feature amount is within a predetermined range, comparison unit 16 associates the voice data which is the calculation source of the first speaker feature amount with speaker identification information for identifying the speaker of the utterance included in the voice data. In this way, comparison unit 16 is capable of increasing the number of voice data associated with the one piece of speaker identification information. Next, comparison unit 16 outputs the voice data and the speaker identification information associated with the voice data.

When the comparison result indicates that (2) the similarity between the first speaker feature amount and the second speaker feature amount is not within the predetermined range, comparison unit 16 associates the voice data which is the calculation source of the first speaker feature amount with speaker identification information for identifying a third speaker different from the speaker of the utterance included in the voice data. In this way, comparison unit 16 is capable of increasing the number of pieces of speaker identification information associated with the voice data. In other words, comparison unit 16 is capable of increasing the number of speakers in training data for performing training of speaker identification model 20. Increasing the number of speakers makes it possible to reduce overtraining in training of speaker identification model 20 to be described later. In this way, it is possible to increase the generalization performances of speaker identification model 20. Next, comparison unit 16 outputs the voice data and the speaker identification information associated with the voice data.

Likewise voice data memory unit 11, extended voice data memory unit 18 stores voice data and speaker identification information for identifying the speaker of an utterance included in the voice data and associated with the voice data, in association with each other.

Voice data storage unit 17 stores the voice data and the speaker identification information associated with the voice data which are output from comparison unit 16 in extended voice data memory unit 18 in such a manner that the voice data and the speaker identification information associated with the voice data in association with each other. In addition, voice data storage unit 17 stores the voice data and the speaker identification information associated with the voice data which are obtained by first voice data obtainment unit 12 in extended voice data memory unit 18 in such a manner that the voice data and the speaker identification information associated with the voice data in association with each other. In this way, extended voice data memory unit 18 stores also voice data output from comparison unit 16 as training data for performing training of the speaker identification model, in addition to the voice data which is stored as training data for training of speaker identification model 20 performed by voice data memory unit 11.

Hereinafter, each of elements included in speaker identification model 20 is described.

Third feature amount calculation unit 21 calculates an utterance feature amount indicating a feature of the utterance included in voice data which has been obtained by identification-target voice data obtainment unit 40, from the voice data. Here, as one example, a description is given assuming that third feature amount calculation unit 21 calculates an MFCC indicating a vocal tract characteristic of a speaker as the utterance feature amount. However, third feature amount calculation unit 21 does not always need to be for use in an example in which an MFCC is calculated as long as third feature amount calculation unit 21 can calculate an utterance feature amount indicating a feature of a speaker. For example, third feature amount calculation unit 21 may calculate, as an utterance feature amount, a result obtained by multiplying a voice signal of an utterance with a mel-filter bank. For example, third feature amount calculation unit 21 may calculate, as an utterance feature amount, a spectrogram of the voice signal of the utterance.

Deep neural network 22 is a deep neural network (DNN) trained in advance to receive, as an input, the utterance feature amount which is calculated by third feature amount calculation unit 21 and output a speaker-dependent feature amount indicating the feature of the speaker of the utterance included in the voice data which is the calculation source of the utterance feature amount. Here, as one example, a description is given assuming that deep neural network 22 is a Kaldi trained in advance to receive, as an input, an MFCC indicating the vocal tract characteristic of the speaker and output, as the speaker-dependent feature amount, x-Vector which is a reverberation feature amount of the utterance obtained by mapping an utterance having a variable length in fixed-dimensional embedding. However, deep neural network 22 does not always need to be limited to the Kaldi as long as deep neural network 22 is a DNN trained in advance to receive, as an input, an utterance feature amount which is calculated by third feature amount calculation unit 21 and output a speaker-dependent feature amount indicating a feature of a speaker. It is to be noted that details regarding the method of calculating the x-Vector, etc. is disclosed in Non-patent Literature 1, and thus the details are not described here specifically.

Determination unit 23 determines the speaker of the utterance included in the voice data obtained by identification-target voice data obtainment unit 40, based on the speaker-dependent feature amount output from deep neural network 22. More specifically, determination unit 23 stores x-Vectors of a plurality of speakers, identifies the x-Vector which is most similar to the x-Vector output from deep neural network 22 among the plurality of x-Vectors stored, and determines the speaker of the x-Vector identified as the speaker of the utterance included in the voice data obtained by identification-target voice data obtainment unit 40. Next, determination unit 23 outputs the speaker identification information which identifies the determined speaker.

Hereinafter, each of elements included in training unit 30 is described.

Second voice data obtainment unit 31 obtains voice data and speaker identification information associated with the voice data from extended voice data memory unit 18.

Second feature amount calculation unit 32 calculates an utterance feature amount indicating a feature of the utterance included in voice data, from the voice data which has been obtained by second voice data obtainment unit 31. Here, as one example, a description is given assuming that second feature amount calculation unit 32 calculate an MFCC indicating a vocal tract characteristic of a speaker as the utterance feature amount. However, second feature amount calculation unit 32 does not always need to be for use in an example in which an MFCC is calculated as long as second feature amount calculation unit 32 can calculate an utterance feature amount indicating a feature of a speaker. For example, second feature amount calculation unit 32 may calculate, as an utterance feature amount, a result obtained by multiplying a voice signal of an utterance with a mel-filter bank. For example, second feature amount calculation unit 32 may calculate, as an utterance feature amount, a spectrogram of the voice signal of the utterance.

First training unit 33 performs training of speaker identification model 20 to receive, as an input, the voice data which is the utterance feature amount calculated by second feature amount calculation unit 32 and the speaker identification information for identifying the speaker of the utterance included in the voice data which is the calculation source of the utterance feature amount and outputs the speaker identification information for identifying the speaker of the utterance included in the voice data.

More specifically, first training unit 33 performs training of deep neural network 22 so that deep neural network 22 receives (i) the MFCC as training data which is the MFCC calculated by second feature amount calculation unit 32 and (ii) the speaker identification information corresponding to the MFCC and outputs the x-Vector indicating the feature of the speaker of the utterance included in the voice data which is the calculation source of the MFCC.

<Operations>

Speaker identification apparatus 1 configured as described above performs training of a speaker identification model, training of a vocal quality conversion model, and speaker identification.

Hereinafter, these processes are described sequentially with reference to the drawings.

Figure 5:
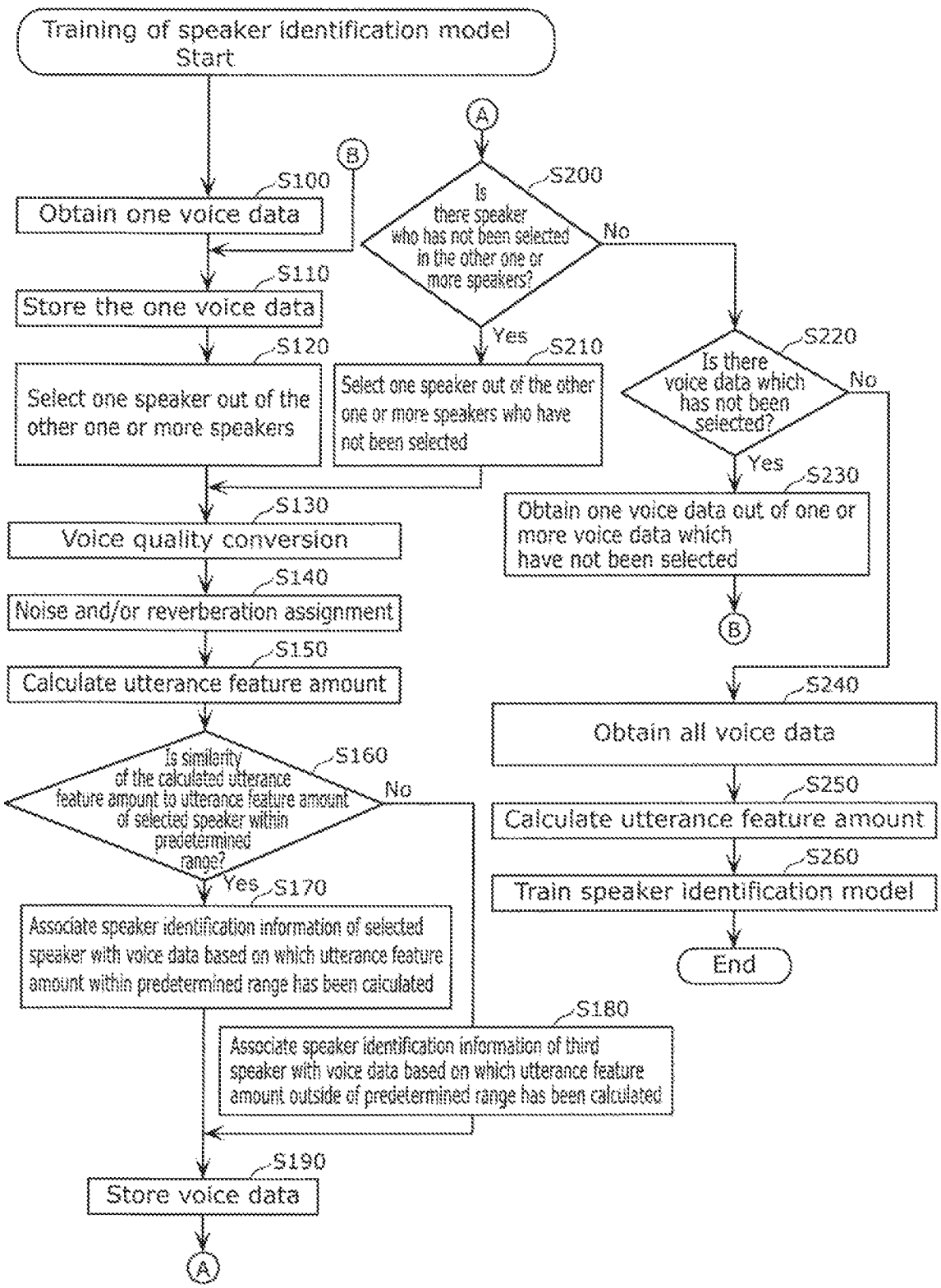
FIG. 5 is a flow chart of training of a speaker identification model according to the embodiment.

FIG. 5 is a flow chart of training of a speaker identification model.

The training of the speaker identification model is processing for training speaker identification model 20.

For example, the training of the speaker identification model is started by means of a user of speaker identification apparatus 1 performing an operation for starting the training of the speaker identification model on speaker identification apparatus X.

Upon the start of the training of a speaker identification model, first voice data obtainment unit 12 obtains one voice data and one piece of speaker identification information associated with the one voice data (Step S100).

Upon the obtainment of the one voice data and the one piece of speaker identification information, voice data storage unit 17 stores the one voice data and the one piece of speaker identification information in extended voice data memory unit 18 in association with each other (Step S110).

Meanwhile, voice quality conversion unit 13 selects one speaker from the one or more speakers other than the speaker who is identified by the one piece of speaker identification information (Step S120). Next, voice quality conversion unit 13 converts the one voice data into voice data which is uttered by the one speaker (Step S130), and outputs the result.

Upon the output of the voice data from voice quality conversion unit 13, noise and/or reverberation assignment unit 14 assigns noise and reverberation to the voice data output from voice quality conversion unit 13 (Step S140), and outputs one or more voice data.

Upon the output of the one or more voice data from noise and/or reverberation assignment unit 14, first feature amount calculation unit 15 calculates an utterance feature amount from each of the voice data output from voice quality conversion unit 13 and the one or more voice data output from noise and/or reverberation assignment unit 14 (Step S150).

Upon the calculation of the utterance feature amount, comparison unit 16 compares the calculated utterance feature amount with the utterance feature amount of the selected one speaker, and determines whether the similarity between the calculated utterance feature amount and the utterance feature amount of the one speaker is within a predetermined range (Step S160).

When comparison unit 16 has determined that the similarity is within the predetermined range in the processing in Step S160 (Yes in Step S160), comparison unit 16 associates the speaker identification information for identifying the selected one speaker with the voice data which is the calculation source of the utterance feature amount determined to be within the predetermined range (Step S170). Next, comparison unit 16 outputs the voice data and the speaker identification information associated with the voice data.

When comparison unit 16 has determined that the similarity is outside the predetermined range in the processing in Step S160 (No in Step S160), comparison unit 16 associates the speaker identification information for identifying a third speaker different from the selected one speaker with the voice data which is the calculation source of the utterance feature amount determined to be outside the predetermined range (Step S180). Next, comparison unit 16 outputs the voice data and the speaker identification information associated with the voice data.

When comparison unit 16 executed either the processing in Step S170 or the processing in Step S180 of each of the utterance feature amounts which are comparison targets in the processing in Step S160, voice data storage unit 17 stores each of the voice data and the speaker identification information associated with the voice data in extended voice data memory unit 18 in association with each other (Step S190).

Upon the end of the processing in Step S190, voice quality conversion unit 13 determines whether one speaker who has not yet been selected in the processing in Step S120 (hereinafter, also referred to as an "unselected speaker" is included in the other one or more speakers (Step S200).

When it is determined that there is an unselected speaker (Yes in Step S200) in the processing in Step S200, voice quality conversion unit 13 selects one speaker from the one or more unselected speakers (Step S210), and proceeds to Step S130.

When it is determined that there is no unselected speaker (No in Step S200) in the processing in Step S200, first voice data obtainment unit 12 determines whether voice data which has not yet been obtained is included in the voice data stored in voice data memory unit 11 (Step S220).

When it is determined that there is audio data which has not yet been obtained (Yes in Step S220) in the processing in Step S220, first voice data obtainment unit 12 selects one voice data from the voice data which has/have not yet been obtained (Step S230), and proceeds to Step S110.

When it is determined that there is no audio data which has not yet been obtained in the processing in Step S220 (No in Step S220), second voice data obtainment unit 31 obtains, for each of the voice data stored in extended voice data memory unit 18, the voice data and the speaker identification information associated with the voice data from extended voice data memory unit 18 (Step S240).

When all the voice data and the speaker identification information associated with the voice data are obtained, second feature amount calculation unit 32 calculates, for each of the voice data, an utterance feature amount indicating a feature of the utterance included in the voice data from the voice data (Step S250).

When utterance feature amounts of ail the voice data are calculated, first training unit 33 performs training of speaker identification model 20 so that speaker identification model 20 receives, for each of the utterance feature amounts, the voice data as training data which are the utterance feature amount and the speaker identification information for identifying the speaker of the utterance included in the voice data which is the calculation source of the utterance feature amount, and outputs the speaker identification information for identifying the speaker of the utterance included in the voice data (Step S260).

Upon the end of the processing in Step S260, speaker identification apparatus 1 ends the training of the speaker identification model.

Figure 6:
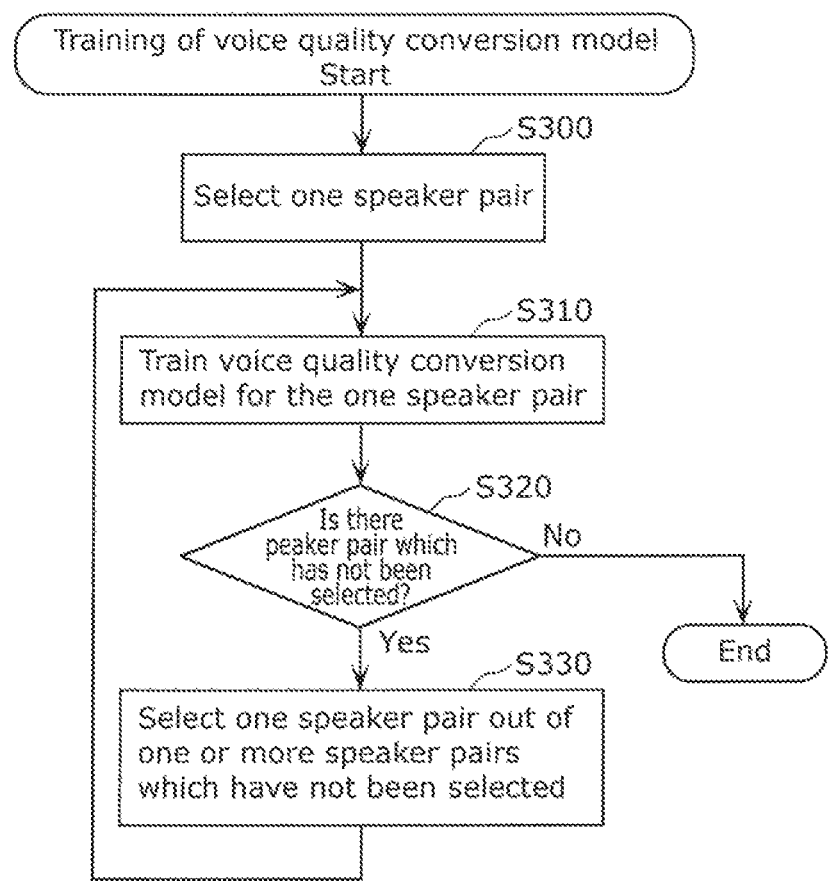
FIG. 6 is a flow chart of training of a voice quality conversion model according to the embodiment.

FIG. 6 is a flow chart of training of a voice quality conversion model.

The training of the voice quality conversion model is processing for performing training of voice quality conversion model 133.

For example, the training of a voice quality conversion model is started by means of a user of speaker identification apparatus 1 performing an operation for starting the training of the voice quality conversion model on speaker identification apparatus 1.

Upon the start of the training of a voice quality conversion model, second training unit 132 selects one speaker pair from a plurality of speakers who are targets of voice quality conversion model 133 (Step S300). Next, second training unit 132 performs training of voice quality conversion model 133 so that voice quality conversion model 133 receives voice data of a first speaker who is one of a currently selected one speaker pair by using training data of each of the two speakers in the speaker pair including the currently selected speaker among the training data stored in data memory unit for voice quality conversion training 131 and outputs voice data of the second speaker who is the other one of the speaker pair, and voice quality conversion model 133 receives voice data of the second speaker and outputs voice data of the first speaker (Step S310).

After performing the training of voice quality conversion model 133 for the one speaker pair, second training unit 132 determines whether there is any unselected speaker pair in the plurality of speakers who are targets of voice quality conversion model 133 (Step S320).

When it is determined that there is a speaker pair which has not yet been obtained in Step S320 (Yes in Step S320), second training unit 132 selects one speaker pair from unselected speaker pairs (Step S330), and proceeds to the processing in Step S310.

When it is determined that there is no speaker pair which has not yet been obtained in Step S320 (No in Step S320), speaker identification apparatus 1 ends the training of the voice quality conversion model.

Figure 7:
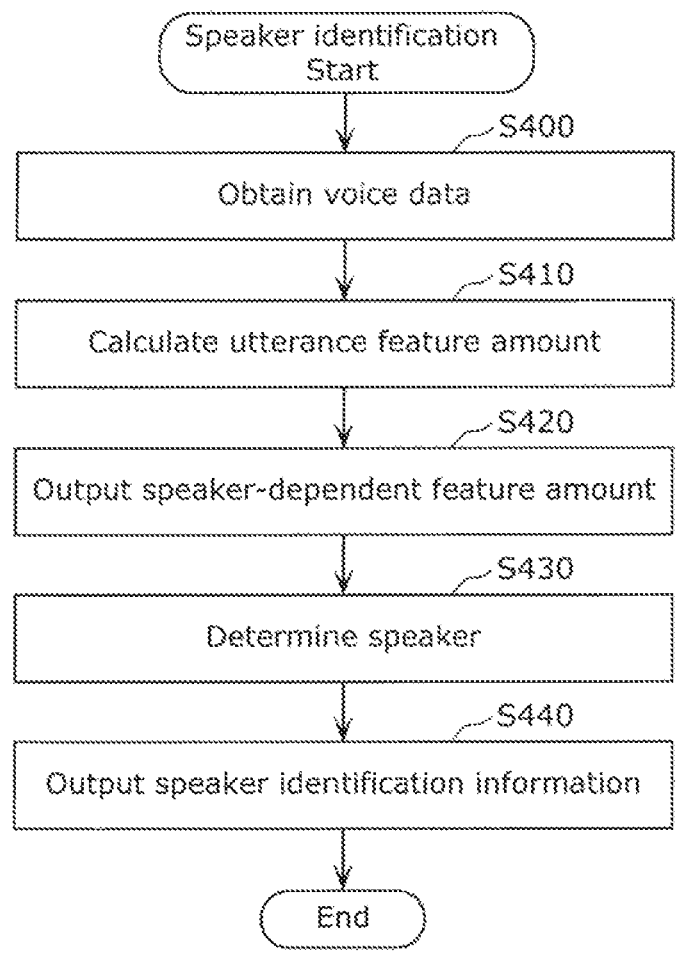
FIG. 7 is a flow chart of training of a speaker identification according to the embodiment.

FIG. 7 is a flow chart of speaker identification.

The speaker identification is processing for identifying the speaker of an utterance included in voice data. More specifically, the speaker identification is processing for causing speaker identification model 20 trained in advance, to receive voice data as an input and to output speaker identification information to speaker identification model 20.

For example, the speaker identification is started by means of a user of speaker identification apparatus 1 performing an operation for starting the speaker identification on speaker identification apparatus 1.

Upon the start of the speaker identification, identification-target voice data obtainment unit 40 obtains voice data which is an identification target (Step S400).

Upon the obtainment of the voice data, third feature amount calculation unit 21 calculates an utterance feature amount indicating a feature of the utterance included in the voice data from the obtained voice data (Step S410), and inputs the calculated utterance feature amount to deep neural network 22. Deep neural network 22 then outputs a speaker-dependent feature amount indicating the feature of the speaker of the utterance included in the voice data which is the calculation source of the input utterance feature amount (Step S420).

Upon the output of the speaker-dependent feature amount, determination unit 23 determines the speaker of the utterance included in the voice data obtained by identification-target voice data obtainment unit 40, based on the output speaker-dependent feature amount (Step S430). Next, determination unit 23 outputs the speaker identification information which identifies the determined speaker (Step S440).

Upon the end of the process in Step S440, speaker identification apparatus 1 ends the speaker identification.

<Consideration>

As described above, speaker identification apparatus 1 extends the training data for performing training of speaker identification model 20 stored in voice data memory unit 11 without being restricted to the contents and languages of utterances. Speaker identification apparatus 1 then performs training of speaker identification model 20 using the extended training data. For this reason, speaker identification apparatus 1 makes it possible to increase the accuracy of speaker identification performed using speaker identification model 20. Accordingly, speaker identification apparatus 1 makes it possible to identify a speaker with high accuracy.

Supplemental Information

Although the speaker identification apparatus according to the embodiment has been described above, it should be noted that the present disclosure is not limited to the embodiment.

For example, each of the processing units included in the speaker identification apparatus according to the embodiment is implemented as an LSI which is an integrated circuit. Each of the processing units may be made as a single chip, or part or all of them may be integrated into a single chip.

In addition, the means for circuit integration is not limited to an LSI, and implementation with a dedicated circuit or a general-purpose processor is also available. It is also possible to use a Field Programmable Gate Array (FPGA) that is programmable after the LSI is manufactured, and a reconfigurable processor in which connections and settings of circuit cells within the LSI are reconfigurable.

In addition, the present disclosure may be implemented as a method of training a speaker identification model or a speaker identification method which are executed by the speaker identification apparatus according to the embodiment.

In addition, in the above embodiment, each of the elements may be configured in the form of a dedicated hardware product, or may be implemented by executing a software program suitable for the element. Each of the elements may be implemented by means of a program execution unit such as a CPU or a processor reading and executing the software program recorded on a recording medium such as a hard disk or a semiconductor memory.

In addition, the splitting into functional blocks in the block diagram is one example, and thus a plurality of functional blocks may be implemented as a single functional block, a single functional block may be split into a plurality of functional blocks, or part of functions may be transferred to another functional block. In addition, functions of a plurality of functional blocks having similar functions may be processed by a single hardware or software product in parallel or in time division.

In addition, the execution order of the steps in each of flow charts is indicated in order to explain the present disclosure specifically, and thus execution orders other than the above ones are also possible. In addition, part of the steps may be executed at the same time (in parallel) with one or more of the other steps.

Although the speaker identification apparatus according to one aspect has been described above based on the embodiment, it is to be noted that the present disclosure is not limited to the embodiment. The one aspect may cover and encompass embodiments that a person skilled in the art may arrive at by adding various kinds of modifications to the above embodiment or by arbitrarily combining some of the elements in any of various kinds of variations within the scope of the present disclosure.

The program causes a computer to execute training of a speaker identification model which receives voice data as an input and outputs speaker identification information for identifying a speaker of an utterance included in the voice data. The training includes: performing voice quality conversion of first voice data of a first speaker to generate second voice data of a second speaker; and performing training of the speaker identification model using, as training data, the first voice data and the second voice data.

The herein disclosed subject matter is to be considered descriptive and illustrative only, and the appended Claims are of a scope intended to cover and encompass not only the particular embodiment disclosed, but also equivalent structures, methods, and/or uses.

INDUSTRIAL APPLICABILITY

The present disclosure is widely applicable to speaker identification apparatuses, etc.

The invention claimed is:

1. A training method of training a speaker identification model which receives voice data as an input and outputs speaker identification information for identifying a speaker of an utterance included in the voice data, the training method comprising:

performing voice quality conversion of first voice data of a first speaker to generate second voice data of a second speaker; and performing training of the speaker identification model using, as training data, the first voice data and the second voice data, wherein the voice quality conversion is processing based on voice data of a first language of the first speaker and voice data of a second language of the second speaker, the first and second languages are different languages, in the performing of the voice quality conversion, the voice quality conversion is performed on the first voice data of the first language to generate the second voice data of the first language, and the training method further comprises:

comparing a speaker feature amount of the second voice data and a speaker feature amount of the second speaker, and determining whether a similarity between the speaker feature amount of the second voice data and the speaker feature amount of the second speaker is within a predetermined range, when, in the determining, it is determined that the similarity is not within the predetermined range, performing, in the performing of training, training using the second voice data as the voice data of a third speaker different from the second speaker.

2. The training method according to claim 1, wherein the voice quality conversion includes inputting the first voice data to a voice quality conversion model and outputting the second voice data from a voice quality conversion model, the voice quality conversion model having been trained in advance to output voice data of the second speaker upon receiving, as the input, voice data of the first speaker.

3. The training method according to claim 2, wherein the voice quality conversion model includes a deep neural network which receives, as the input, voice data in waveform audio (WAV) format and outputs voice data in the WAV format.

4. The training method according to claim 1, wherein the speaker identification model includes a deep neural network which obtains, as the input, an utterance feature amount indicating a feature of an utterance included in voice data and outputs a speaker-dependent feature amount indicating a feature of a speaker.

5. A method of identifying a speaker, comprising:

inputting voice data to the speaker identification model which has been trained in advance using the training method according to claim 1; and outputting the speaker identification information from the speaker identification model.

6. A non-transitory computer-readable recording medium having a program recorded thereon, the program causing a computer to execute training of a speaker identification model which receives voice data as an input and outputs speaker identification information for identifying a speaker of an utterance included in the voice data, wherein the training includes:

performing voice quality conversion of first voice data of a first speaker to generate second voice data of a second speaker; and performing training of the speaker identification model using, as training data, the first voice data and the second voice data, wherein the voice quality conversion is processing based on voice data of a first language of the first speaker and voice data of a second language of the second speaker, the first and second languages are different languages, in the performing of the voice quality conversion, the voice quality conversion is performed on the first voice data of the first language to generate the second voice data of the first language, and the training further comprises:

comparing a speaker feature amount of the second voice data and a speaker feature amount of the second speaker, and determining whether a similarity between the speaker feature amount of the second voice data and the speaker feature amount of the second speaker is within a predetermined range, when, in the determining, it is determined that the similarity is not within the predetermined range, performing, in the performing of training, training using the second voice data as the voice data of a third speaker different from the second speaker.

* * * * *